(12) United States Patent
Bonacini

(10) Patent No.: US 9,944,136 B2
(45) Date of Patent: *Apr. 17, 2018

(54) MACHINE FOR REMOVING AND FITTING WHEEL TYRES FOR VEHICLES

(71) Applicant: Giuliano Group S.p.A., Correggio (RE) (IT)

(72) Inventor: Maurizio Bonacini, Correggio (IT)

(73) Assignee: Giuliano Group S.p.A., Correggio (RE) (IT)

(*) Notice: Subject to any disclaimer, the term of this patent is extended or adjusted under 35 U.S.C. 154(b) by 227 days.

This patent is subject to a terminal disclaimer.

(21) Appl. No.: 14/848,425

(22) Filed: Sep. 9, 2015

(65) Prior Publication Data

US 2016/0075195 A1    Mar. 17, 2016

(30) Foreign Application Priority Data

Sep. 12, 2014   (IT) .............................. MO2014A0255

(51) Int. Cl.
   *B60C 25/138*   (2006.01)
   *B60C 25/05*    (2006.01)

(52) U.S. Cl.
   CPC ........ *B60C 25/138* (2013.01); *B60C 25/0551* (2013.01); *B60C 25/0572* (2013.01)

(58) Field of Classification Search
   CPC .............. B60C 25/138; B60C 25/0551; B60C 25/0572
   See application file for complete search history.

(56) References Cited

U.S. PATENT DOCUMENTS

| 6,182,736 B1 * | 2/2001 | Cunningham ........ B60C 25/135 157/1.17 |
| 7,438,109 B2 * | 10/2008 | Cunningham ........ B60C 25/138 157/1.24 |

(Continued)

FOREIGN PATENT DOCUMENTS

EP   2756969   7/2014

OTHER PUBLICATIONS

Translation of Search Report and Written Opinion dated May 5, 2015 From the Ministero Dello Sviluppo Economico, Direzione Generale Sviluppo Produttivo e Competitiva, Ufficio Italiano Brevetti e Marchi Re. Application No. ITMO 20140255.

*Primary Examiner* — David B Thomas

(57) ABSTRACT

The machine (1) for removing and fitting wheel tires for vehicles comprises a bearing structure (2), a clamping device (5) of a rim (C) of a wheel (R) for vehicles, associated with the bearing structure (2) and rotatable around a first axis of rotation (X1), a tool-carrying arm (6) associated movable with the bearing structure (2) and having a removing/fitting tool (7) of a tire (P) from/onto the rim (C), an auxiliary arm (8) having a bead pressing tool (9, 10) able to facilitate the removing/fitting operations of the tire (P) from/onto the rim (C), wherein the auxiliary arm (8) is associated rotatable with the bearing structure (2) around a second axis of rotation (X2) substantially parallel to the first axis of rotation (X1), in correspondence of a hinging point (14) arranged above with respect to a resting plane of the rim (C) defined by the clamping device (5), and wherein the auxiliary arm (8) can be positioned between a work position, wherein the bead pressing tool (9, 10) is able to be engaged on a portion of the tire (P), and a rest position, wherein the auxiliary arm (8) is retracted and substantially spaced from the clamping device (5), and wherein the machine (1) comprises an (Continued)

automatic positioning apparatus (20) of the auxiliary arm (8) in the rest position.

10 Claims, 6 Drawing Sheets

(56) References Cited

U.S. PATENT DOCUMENTS

| | | | | |
|---|---|---|---|---|
| 7,481,258 | B2* | 1/2009 | Vignoli | B60C 25/138 |
| | | | | 157/1.17 |
| 8,387,675 | B1* | 3/2013 | Vaninger | B60C 25/138 |
| | | | | 157/1.17 |
| 8,528,620 | B2* | 9/2013 | Cai | B60C 25/138 |
| | | | | 157/1.17 |
| 8,613,303 | B1* | 12/2013 | Hanneken | B60C 25/138 |
| | | | | 157/1.17 |
| 8,783,326 | B1 | 7/2014 | Vaninger et al. | |
| 8,943,880 | B2* | 2/2015 | Vignoli | B60C 25/0554 |
| | | | | 73/146 |
| 9,073,394 | B1* | 7/2015 | Clasquin | B60C 25/138 |
| 9,216,621 | B2* | 12/2015 | Barbetti | B60C 25/132 |
| 9,227,473 | B2* | 1/2016 | Sotgiu | B60C 25/138 |
| 9,375,984 | B2* | 6/2016 | Bonacini | B60C 25/138 |
| 9,434,219 | B1* | 9/2016 | Clasquin | B60C 25/0548 |
| 9,662,946 | B2* | 5/2017 | Corghi | B60C 25/138 |
| 2012/0222823 | A1 | 9/2012 | Mimura | |
| 2014/0196856 | A1* | 7/2014 | Bonacini | B60C 25/138 |
| | | | | 157/1.24 |
| 2016/0001617 | A1* | 1/2016 | Corghi | B60C 25/0512 |
| | | | | 29/894.31 |
| 2016/0001618 | A1* | 1/2016 | Corghi | B60C 25/138 |
| | | | | 29/894.31 |

* cited by examiner

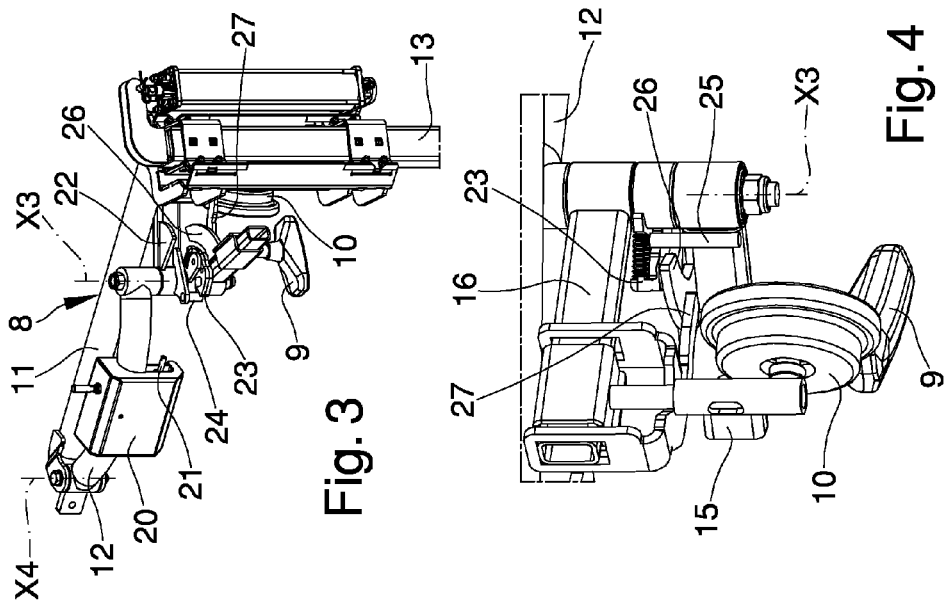
Fig. 3
Fig. 4
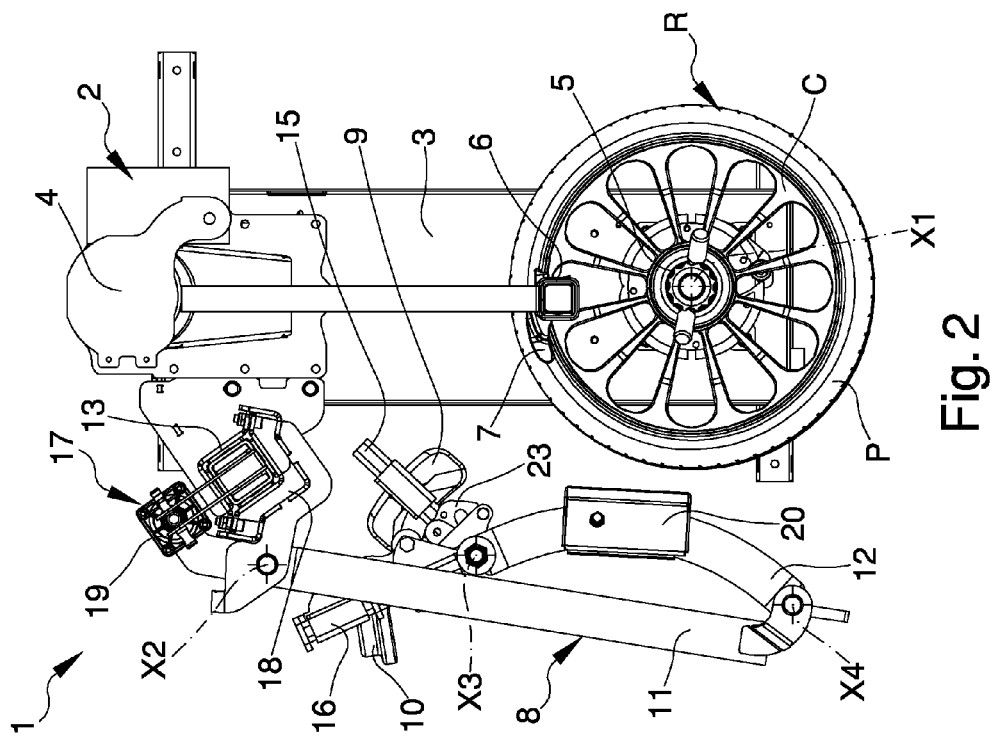
Fig. 2

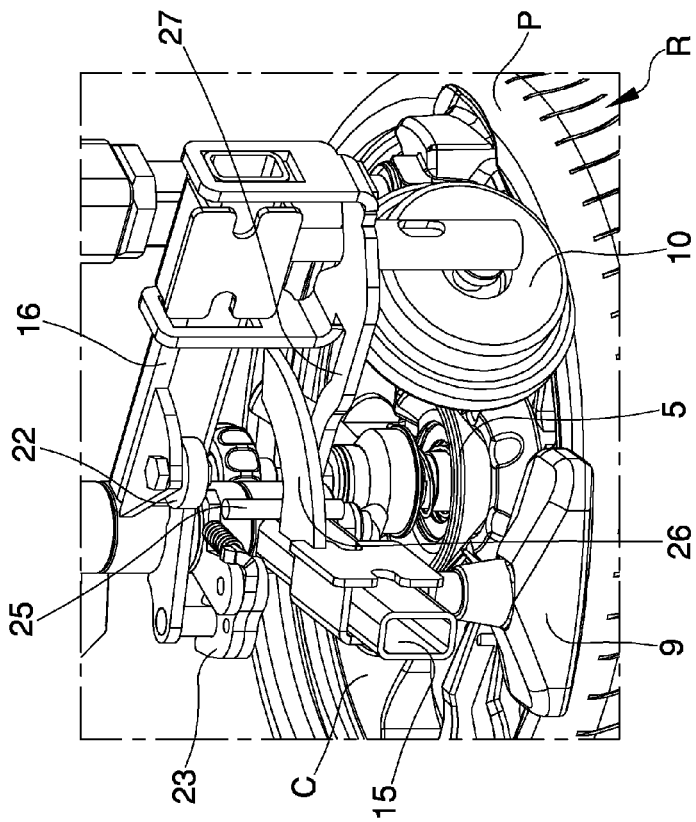
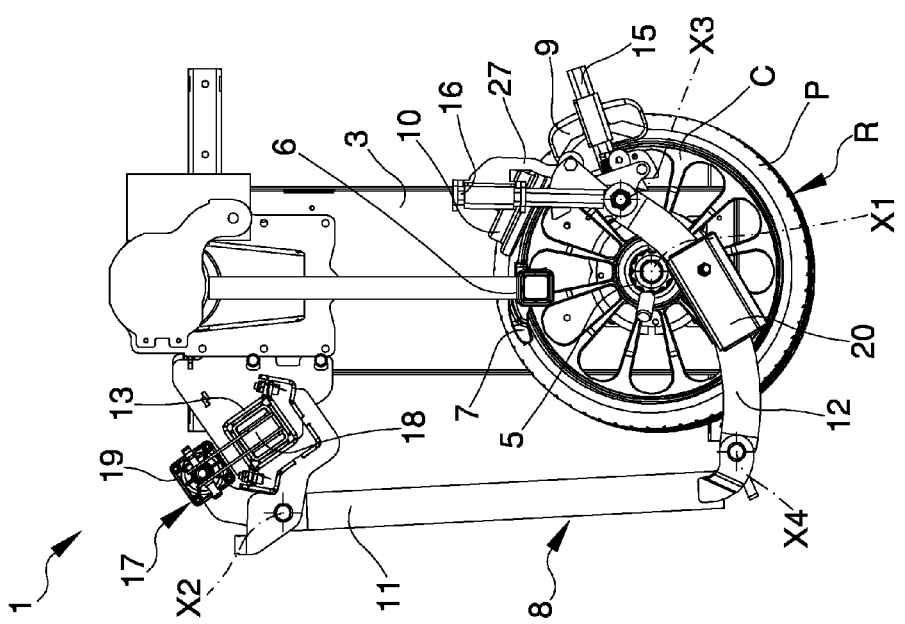
Fig. 5
Fig. 6

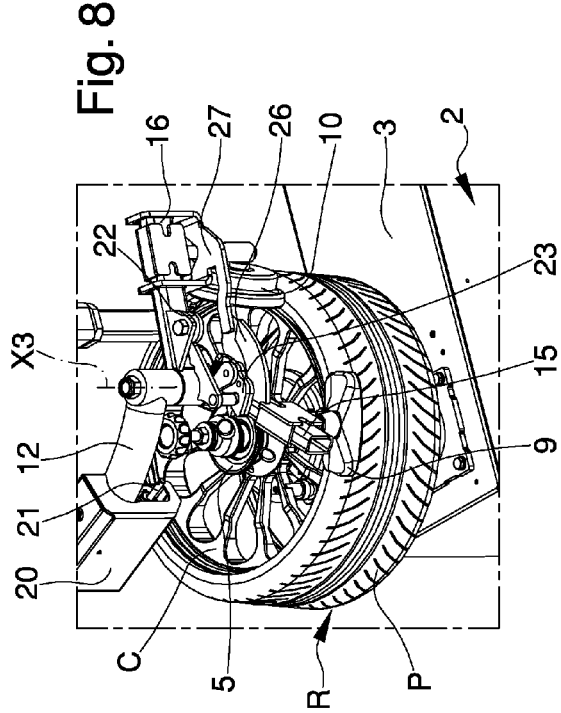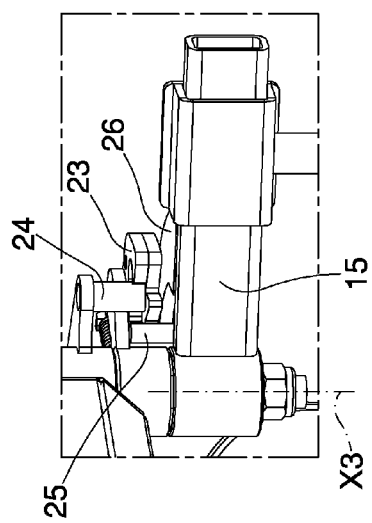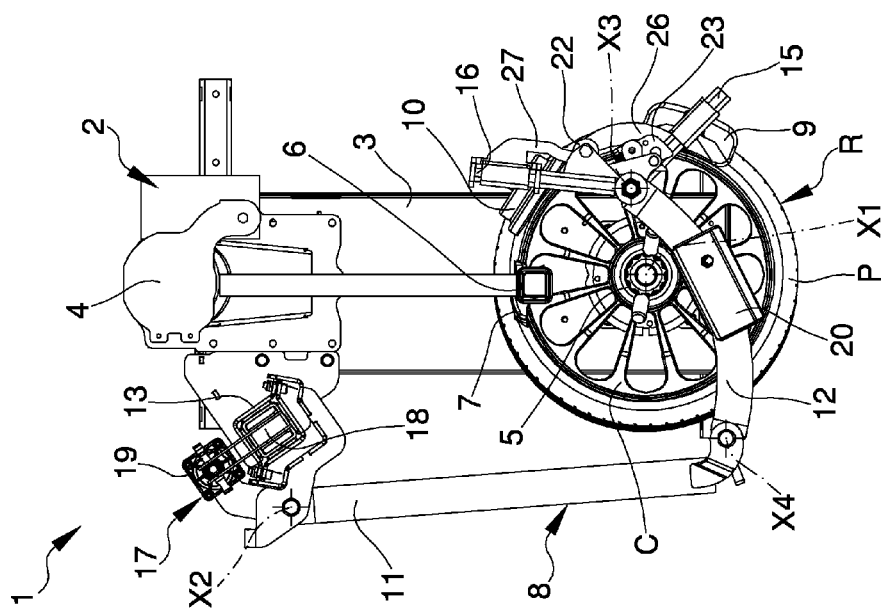

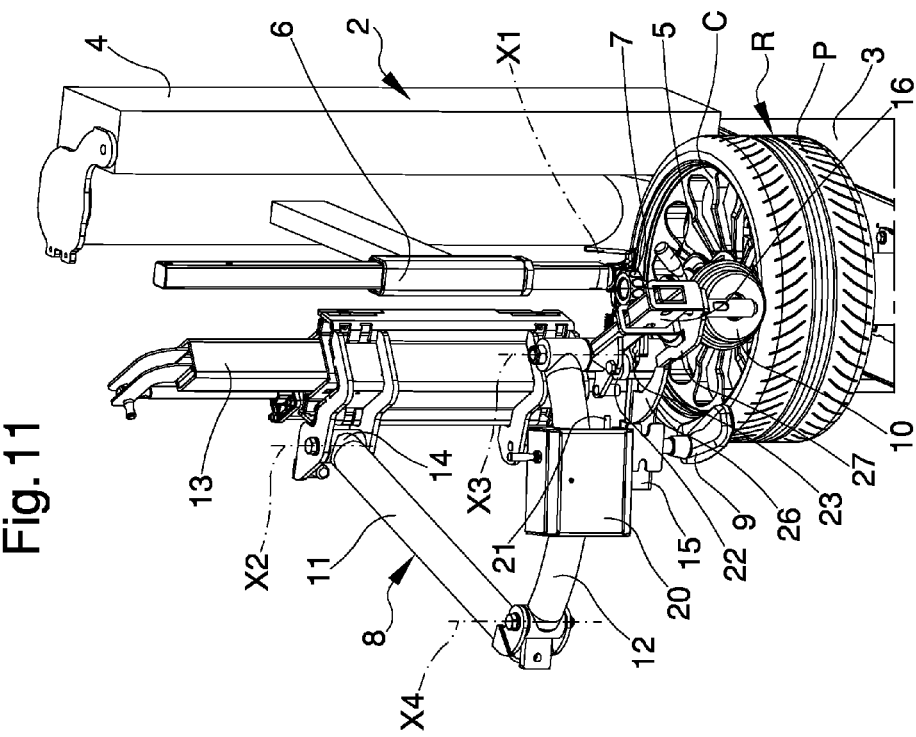

MACHINE FOR REMOVING AND FITTING WHEEL TYRES FOR VEHICLES

RELATED APPLICATION

This application claims the benefit of priority of Italian Patent Application No. MO2014A000255 filed Sep. 12, 2014, the contents of which are incorporated herein by reference in their entirety.

FIELD AND BACKGROUND OF THE INVENTION

The present invention relates to a machine for removing and fitting wheel tyres for vehicles.

The use of machines, so-called "tyre-changing machines", is known which allow the fitting and removal of the tyre from the relative rim of a wheel for vehicles.

These tyre-changing machines are used, e.g., in garages to run maintenance or replacement jobs of the rim and/or of the tyre itself.

Generally, known tyre-changing machines comprise a supporting frame to support a gripping and rotation device of the rim of a wheel, and to support a tool-carrying arm having at least one tool able to remove and/or fit the tyre from/onto the rim.

The supporting frame generally comprises a support base of the gripping and rotation device of the rim, commonly consisting of a special self-centering spindle positioned at a predetermined height from the ground.

The supporting frame also comprises a vertical upright which extends from the rear portion of the base and which supports a special tool-carrying arm adjustable along a horizontal direction depending on the specific dimensions of the wheel to be machined.

The tool-carrying arm has a vertically adjustable removing/fitting tool.

The use is also known of at least an auxiliary arm having one or more special bead pressing tools, employable to facilitate the fitting/removal operations onto/from the rim, in particular for lower profile and "runflat" tyres.

For example, a first type of auxiliary arm comprises a horizontal arm hinged to the vertical upright of the supporting frame and rotatable in a vane-like fashion, with which the bead pressing tool is associated vertically movable.

A second type of auxiliary arm comprises a horizontal articulated arm hinged to the vertical upright of the supporting frame and rotatable in a vane-like fashion, with which are associated two or more small tool-carrying arms having separate bead pressing tools (pressers and/or rollers).

In particular, the tool-carrying arms are articulated to the horizontal arm and, conventionally, are able to rotate with respect thereto around a vertical axis coincident with the vertical axis of rotation of the wheel on the spindle.

The horizontal arm or the bead pressing tools themselves are then movable vertically to allow the positioning thereof on the tyre.

In the removal phase, an operator positions and locks the rim of the wheel to be machined on the spindle and performs, by means of a special bead breaking tool, a preliminary phase of removal of the tyre bead from the rim edge.

Subsequently, the operator adjusts the position of the removing/fitting tool according to the specific dimensions of the wheel and positions it in correspondence of a section of the tyre to be lifted above the rim edge, and moves the tool in order to extract a portion of the bead above the rim.

The auxiliary arm is rotated as far as to position the bead pressing tool or tools in correspondence of a portion of the tyre substantially opposite the portion of the tyre lifted portion by means of the removing/fitting tool.

In particular, the pressure applied by the bead pressing tool facilitates the extraction of the tyre bead.

Subsequently, the wheel is partially rotated to allow the extraction of the bead and, during such rotation, each bead pressing tool continues to apply a pressure on the tyre, following the rotation of the wheel.

When the bead pressing tool is located in the proximity of the removing/fitting tool, then the operator raises the bead pressing tool by activating the specific command lever and positions the auxiliary arm in a rest position in order not to hamper the operator's movements during removal of the tyre from the rim.

The complete rotation of the wheel then allows to complete the extraction of the wheel bead above the rim edge.

Similarly, in the fitting phase, an operator positions and locks the wheel rim to be machined on the spindle and positions in a suitable manner the tyre to be fitted on the rim.

Subsequently, the operator adjusts the position of the removing/fitting tool according to the specific dimensions of the wheel and positions it in correspondence of a section of the tyre while pressing it below the rim edge.

The auxiliary arm is rotated as far as to position the bead pressing tool or tools in correspondence of a portion of the tyre, in the proximity of the removing/fitting tool.

In particular, the pressure applied by the bead pressing tool facilitates the insertion of the tyre bead.

Subsequently, the wheel is partially rotated to allow the insertion of the bead and, during such rotation, the bead pressing tool continues to apply a pressure on the tyre, following the rotation of the wheel.

When the bead pressing tool is located in the proximity of the removing/fitting tool, then the operator raises the bead pressing tool by activating the specific command lever and positions the auxiliary arm in a rest position in order not to hamper the operator's movements during the removal of the tyre from the rim.

The complete rotation of the wheel then allows to complete the insertion of the wheel bead below the rim edge.

The known solutions described above do however have some drawbacks.

In particular, subsequently to the use for tyre removing/fitting operations, the auxiliary arm must necessarily be repositioned in the rest position, with the bead pressing tool spaced away from the rim gripping and rotation means, in order not to hamper the operator's movements during the removal or the positioning of the tyre from/onto the rim.

Therefore, this operation inevitably involves an increase in the time required to complete the tyre removing/fitting operations.

The document EP 2,756,969 describes a machine for removing and fitting wheel tyres for vehicles having an auxiliary arm with a bead pressing tool able to facilitate the removing/fitting operations of the tyre from/onto the rim (C).

The auxiliary arm has however a particular conformation and is associated rotatable to the bearing structure of the machine in correspondence of a hinging point arranged below with respect to the resting plane of the rim of a wheel.

The document U.S. Pat. No. 8,783,326 describes a tyre-changing machine comprising an auxiliary arm having several bead pressing tools and automatic means able to control and manage the movement of the bead pressing tools during the removing/fitting operations of a tyre.

However, the machine described in that document does not carry out the automatic repositioning of the auxiliary arm in a rest position, so as to automatically limit the overall dimensions of the auxiliary arm at the end of the removing/fitting operations.

SUMMARY OF THE INVENTION

The main aim of the present invention is to provide a machine for removing and fitting wheel tyres for vehicles which allows to simplify and speed up the removing/fitting operations of the tyre.

Another object of the present invention is to provide a machine for removing and fitting wheel tyres for vehicles which allows to overcome the mentioned drawbacks of the prior art within the ambit of a simple, rational, easy, effective to use and affordable solution.

The objects stated above are achieved by the present machine for removing and fitting wheel tyres for vehicles according to claim 1.

BRIEF DESCRIPTION OF THE SEVERAL VIEWS OF THE DRAWINGS

Other characteristics and advantages of the present invention will become better evident from the description of a preferred but not exclusive embodiment of a machine for removing and fitting wheel tyres for vehicles, illustrated by way of an indicative but non-limiting example in the accompanying drawings, in which:

FIGS. 2, 3, 4, 5, 6, 7, 8, 9, 10, 11, 12 and 13 show the operation of the machine according to the invention during a fitting operation of a tyre on the rim of a wheel.

DESCRIPTION OF SPECIFIC EMBODIMENTS OF THE INVENTION

Figure 1:
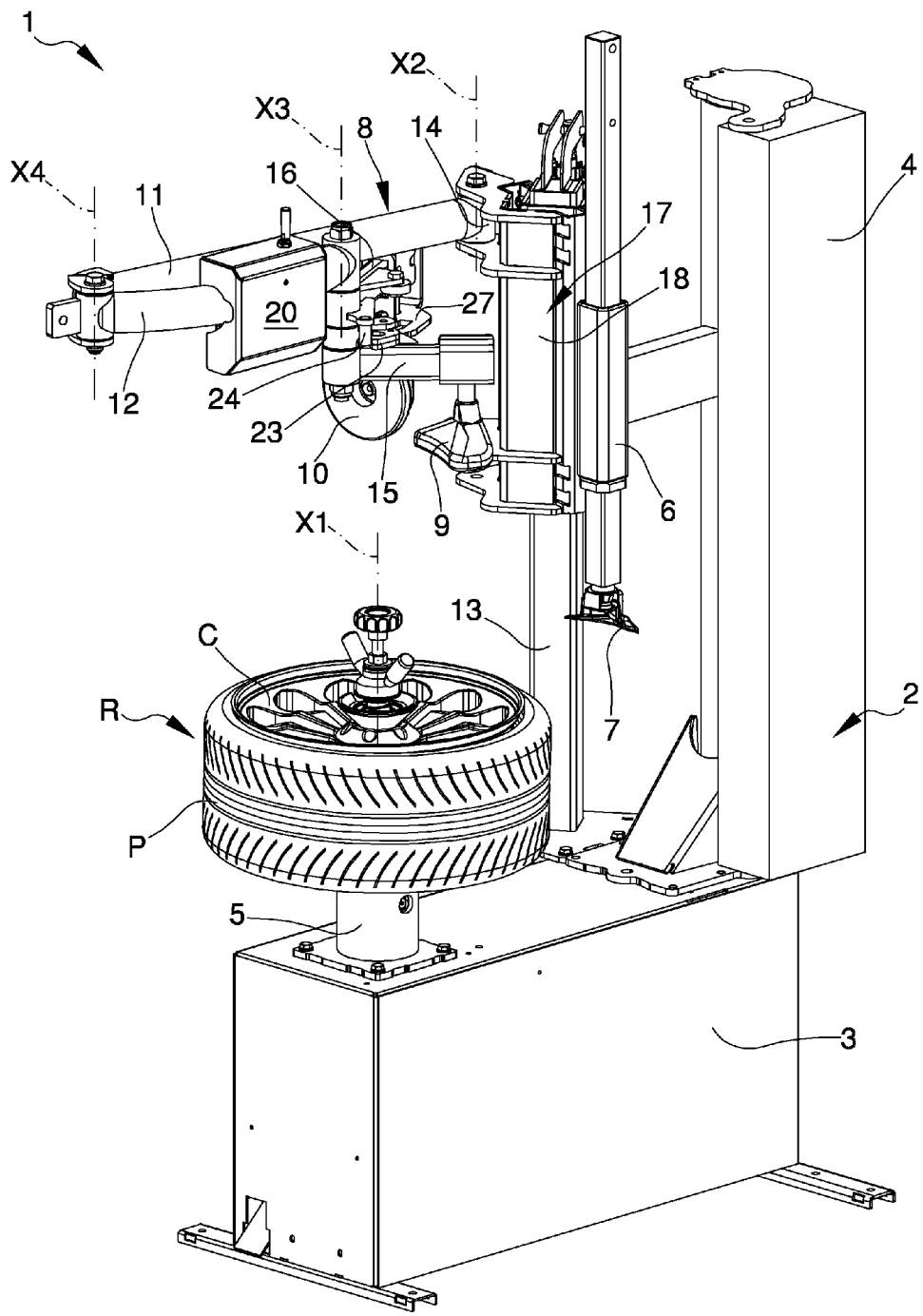
FIG. 1 is an axonometric view of the machine according to the invention.

With particular reference to such figures, reference number 1 globally indicates a machine for removing and fitting wheel tyres for vehicles.

In particular, the machine 1 comprises a bearing structure 2 having a base 3 for resting on the ground and an upright 4 which extends from the base 3.

A clamping device 5 of a rim C of a wheel R for vehicles is supported by the bearing structure 2 and is rotatable around a first axis of rotation X1. Such clamping device 5 can e.g. be composed of a self-centering spindle able to receive in support and lock a wheel R.

The machine 1 comprises a tool-carrying arm 6 supported in a movable manner by the upright 4 and having a removing/fitting tool 7 of a tyre P from/onto the rim C of a wheel R fitted on the clamping device 5.

Furthermore, the machine 1 comprises an auxiliary arm 8 having one or more bead pressing tools able to facilitate the removing/fitting operations of the tyre P from/onto the rim C.

In particular, with reference to the preferred embodiment illustrated in the figures, the auxiliary arm 8 comprises two bead pressing tools 9 and 10: a first bead pressing tool 9 consisting of a presser, a second bead pressing tool 10 consisting of a roller.

Specifically, the auxiliary arm 8 comprises a horizontal arm 11, 12 associated rotatable with an additional upright 13 of the bearing structure 2, in correspondence of at least one hinging point 14 arranged above with respect to a resting plane of the rim C defined by the clamping device 5.

The horizontal arm 11, 12 is associated rotatable with the additional upright 13 around a second axis of rotation X2 parallel to the first axis of rotation X1 of the wheel R.

The auxiliary arm 8 also comprises a first small arm 15 and a second small arm 16 having the first bead pressing tool 9 and the second bead pressing tool 10 respectively, and associated with one extremity of the horizontal arm 11, 12 rotatable around a third axis of rotation X3 parallel to the first axis of rotation X1. Conveniently, the distance of the third axis of rotation X3 with respect to the first axis of rotation X1 while using the auxiliary arm 8 is defined by the following formula:

$$0 < d(X1, X3) < r$$

where $d(X1, X3)$ indicates the distance of the third axis of rotation X3 with respect to the first axis of rotation X1 and r indicates at least a value corresponding to the radius of the wheel R on which it is possible to perform the tyre removing/fitting operations.

Therefore, the third axis of rotation X3 of the first and second small arm 15 and 16 is never coaxial to the first axis of rotation X1 of the wheel R.

With reference to the preferred embodiment illustrated in the figures, the horizontal arm 11, 12 comprises a first portion 11 associated rotatable with the additional upright 13 around the second axis of rotation X2 and a second portion 12 associated rotatable with one extremity of the first portion 11 around a fourth axis of rotation X4 substantially parallel to the first axis of rotation X1.

The first small arm 15 and second small arm 16 are therefore associated with one extremity of the second portion 12 rotatable around the third axis of rotation X3.

The machine 1 comprises a movement device 17 for the movement of the auxiliary arm 8 and/or of the bead pressing tools 9 and 10 along a substantially vertical direction between a raised position and a lowered position.

In particular, with reference to the embodiment illustrated in the figures, the movement device 17 comprises a slide 18 sliding along the additional upright 13 and a pneumatic actuator 19 associated with the slide 18. Different implementations of the movement device 17 cannot however be ruled out.

The auxiliary arm 8 can be positioned between one or more work positions, wherein the first and the second bead pressing tool 9 and 10 are able to be engaged on respective portions of the tyre P, and a rest position, wherein the auxiliary arm 8 is retracted and spaced from the clamping device 5.

Advantageously, the machine 1 comprises an automatic positioning apparatus 20 able to position the auxiliary arm 8 in the above-mentioned rest position, at the end of the removing/fitting operations of the tyre P onto/from a wheel R.

The automatic positioning apparatus 20 comprises an automatic operation device 21 of the movement device 17 operatively connected to the auxiliary arm 8 and able to be automatically activated in correspondence of a predetermined angular position of the auxiliary arm 8 itself to bring the first and the second bead pressing tool 9 and 10 from the lowered position to the raised position.

For example, the automatic operation device 21 can be composed of a switch and the second small arm 16 comprises a contact portion 22 which can be engaged on the switch 21 in correspondence of at least a predefined angular position of the second small arm itself.

In particular, with reference to the embodiment illustrated in the figures, the automatic positioning apparatus 20 is integrated inside the control unit of the auxiliary arm 8 and the automatic operation device 21 is made up of a switch located overhanging from the control unit.

In addition, the automatic positioning apparatus 20 comprises a return element, not shown in the illustrations, associated with the auxiliary arm 8 and able to bring the auxiliary arm itself back to the rest position when the first and the second bead pressing tool 9 and 10 are in the raised position.

For example, the return element can be composed of one or more elastic elements positioned on the auxiliary arm 8, in particular between the first portion 11 of the horizontal arm 11, 12 and the additional upright 13 and between the second portion 12 and the first portion 11 of the horizontal arm 11, 12.

Advantageously, the auxiliary arm 8 comprises a locking/unlocking apparatus 23, 24, 25, 26 for locking the second small arm 16 with respect to the second portion 12 of the horizontal arm 11, 12.

In particular, the locking/unlocking apparatus 23, 24, 25, 26 comprises a retaining element 23 associated with the second portion 12 of the horizontal arm 11, 12 and movable between a fastening position, wherein the retaining element 23 is engaged on the second small arm 16 to keep the second portion 12 and the second small arm 16 linked together, and an unfastening position, wherein the retaining element 23 is disengaged from the second small arm 16 and the second small arm 16 is free to rotate around the third axis of rotation X3.

With reference to a preferred embodiment, shown in the illustrations, the retaining element 23 is composed of a hook linked together with the second portion 12 of the horizontal arm 11, 12 attachable to a respective pin 24 fixed to the second small arm 16. The hook 23 is movable from the fastening position to the unfastening position against the action of a spring 24.

Moreover, the locking/unlocking apparatus 23, 24, 25, 26 comprises an operation device 25 able to move the hook 23 from the fastening position to the unfastening position in correspondence of at least a predefined angular position of the first small arm 15.

In particular, with reference to the preferred embodiment illustrated in the figures, the operation device 25 is made up of a pushing element linked together with the first small arm 15 and engageable on the hook 23 in correspondence of a predefined angular position of the first small arm 15 with respect to the second small arm 16.

Conveniently, the auxiliary arm 8 comprises a first spacer element 26 fixed to the first small arm 15 and a second spacer element 27 fixed to the second small arm 16 of predefined extension and shape and such as to maintain a predefined minimum distance between the first small arm 15 and the second small arm 16.

The operation of the auxiliary arm 8 is described below.

FIGS. 2, 3, 4, 5, 6, 7, 8, 9, 10, 11, 12 and 13 illustrate by way of example a sequence of positions of the auxiliary arm 8 during a fitting operation of a tyre P on the rim C of a wheel R.

First of all, an operator positions and locks the rim C on the clamping device 5 and suitably positions the tyre P to be fitted on the rim C. During this operation, the auxiliary arm 8 is in the rest position (FIGS. 2, 3 and 4).

Subsequently, the operator adjusts the position of the removing/fitting tool 7 according to the specific dimensions of the wheel, positioning it in correspondence of a section of the tyre P and pressing it below the edge of the rim C.

The auxiliary arm 8 is rotated as far as to position the first and second bead pressing tool 9 and 10 in correspondence of a portion of the tyre, in the proximity of the removing/fitting tool 7. In this position, the first small arm 15 and second small arm 16 are substantially close together and the hook 23 is locked on the pin 24, so as to make the second small arm 16 locked together with the second portion 12 of the horizontal arm 11, 12.

The first and second bead pressing tool 9 and 10 are therefore lowered as far as to be positioned in contact with the tyre P to push it below the edge of the rim C (FIGS. 5 and 6).

Subsequently, the wheel R is partially rotated to allow the insertion of the entire bead of the tyre P below the edge of the rim C.

During this rotation, the first small arm 15 rotates around the third axis of rotation X3 and the first bead pressing tool 9 continues to apply a pressure on the tyre P, following the rotation of the wheel R. The second small arm 16, on the other hand, remains locked together with the second portion 12 and the second bead pressing tool 10 remains substantially stationary.

Once the first small arm 15 has carried out a predetermined angular displacement, the pushing element 25 engages on the hook 23 and releases the pin 24 (FIGS. 7, 8 and 9).

At this point, also the second small arm 16 can rotate freely around the third axis of rotation X3 and the second bead pressing tool 10 is driven in rotation by the tyre P (FIGS. 10 and 11).

Figure 12:
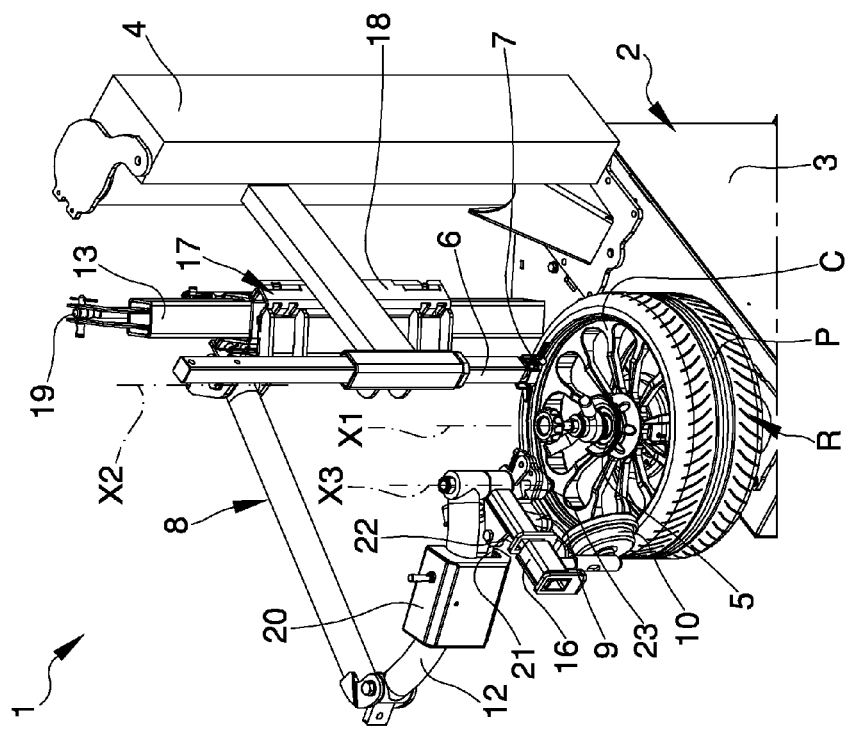

When the first and the second small arm 15 and 16 have almost completed a full rotation, at a predefined angular position the contact portion 22 of the second small arm 16 contacts and presses the switch 21, which operates the actuator 19 that raises the auxiliary arm 8 and consequently, the bead pressing tools 9 and 10 from the tyre (FIG. 12).

Figure 13:
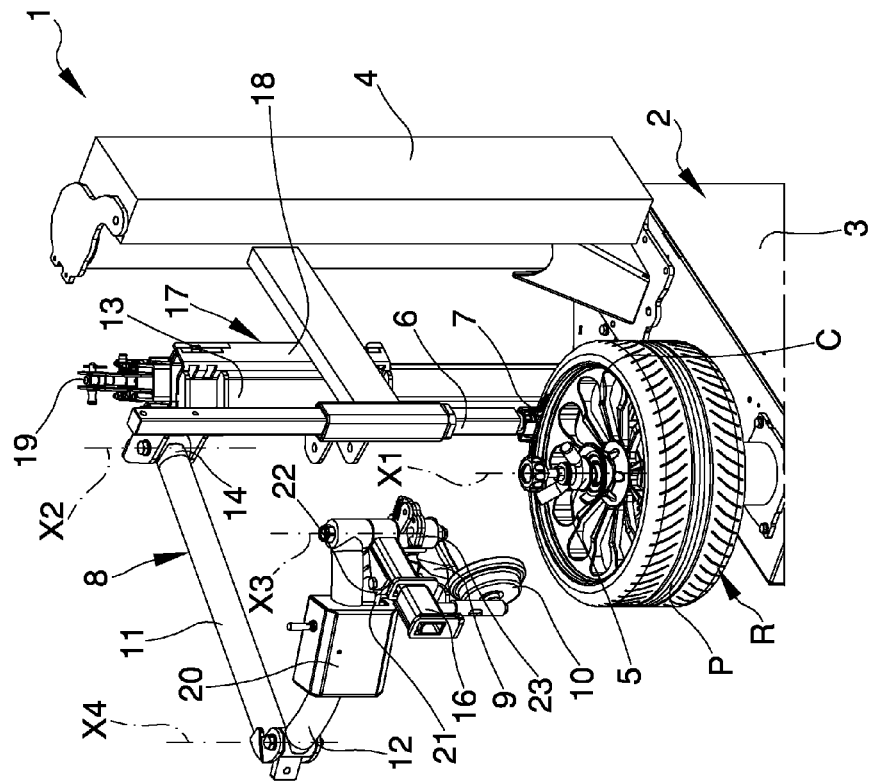

The auxiliary arm 8 is therefore positioned in the rest position thanks to the thrust impressed by the rotation of the wheel R and, thanks to the presence of at least an elastic return element along the horizontal arm 11, 12 (FIG. 13).

The full rotation of the wheel R allows therefore to complete the insertion of the bead of the tyre P below the edge of the rim C.

It has in practice been observed how the described invention achieves the intended objects.

In particular, the fact is underlined that the auxiliary arm of the machine according to the invention allows to simplify and speed up the tyre removing/fitting operations, in particular by automating the repositioning of the auxiliary arm itself and of the respective bead pressing tools in a rest position.

What is claimed is:

1. Machine (1) for removing and fitting wheel tyres for vehicles, comprising:
    at least a bearing structure (2), a clamping device (5) of a rim (C) of a wheel (R) for vehicles, associated with said bearing structure (2) and rotatable around a first axis of rotation (X1),
    at least a tool-carrying arm (6) associated movable with said bearing structure (2) and having at least a removing/fitting tool (7) of a tyre (P) from/onto said rim (C),
    at least an auxiliary arm (8) having at least a bead pressing tool (9, 10) able to facilitate the removing/fitting operations of the tyre (P) from/onto the rim (C), and at least a movement device (17) of said auxiliary arm (8) and/or of said at least one bead pressing tool (9, 10) along a substantially vertical direction between a raised position and a lowered position;

wherein said auxiliary arm (8) is associated rotatable with said bearing structure (2) around a second axis of rotation (X2) substantially parallel to said first axis of rotation (X1), in correspondence of at least one hinging point (14) arranged above with respect to a resting plane of said rim (C) defined by said clamping device (5), wherein said auxiliary arm (8) can be positioned between at least a work position, wherein said at least one bead pressing tool (9, 10) is able to be engaged on at least a portion of said tyre (P), and a rest position, wherein said auxiliary arm (8) is retracted and substantially spaced from said clamping device (5), wherein the machine (1) comprises an automatic positioning apparatus (20) of said auxiliary arm (8) in said rest position;

wherein said automatic positioning apparatus (20) comprises at least an automatic operation device (21) of said movement device (17) operatively connected to said auxiliary arm (8) and able to be automatically activated in correspondence of a predetermined angular position of said auxiliary arm (8) to bring said at least one bead pressing tool (9, 10) from said lowered position to said raised position;

wherein said auxiliary arm (8) comprises at least a horizontal arm (11, 12) associated rotatable with said bearing structure (2) around said second axis of rotation (X2) and at least a small arm (15, 16) having said at least one bead pressing tool (9, 10) and associated rotatable with said horizontal arm (11, 12) around a third axis of rotation (X3) substantially parallel to said first axis of rotation (X1);

wherein said automatic positioning apparatus (20) comprises at least a return element associated with said auxiliary arm (8) and able to bring said auxiliary arm (8) back to said rest position when said at least one bead pressing tool (9, 10) is in the raised position;

wherein said return element comprises at least an elastic element associated with said auxiliary arm (8).

2. Machine (1) according to claim 1, wherein the distance of said third axis of rotation (X3) with respect to said first axis of rotation (X1) is defined by the following formula:

$$0<d(X1,X3)<r$$

where d(X1, X3) indicates said distance of the third axis of rotation (X3) with respect to the first axis of rotation (X1) and r indicates the radius of said wheel (R).

3. Machine (I) according to claim 2, wherein said horizontal arm (11, 12) comprises at least a first portion (11) associated rotatable with said bearing structure (2) around said second axis of rotation (X2) and at least a second portion (12) associated rotatable with said first portion (11) around a fourth axis of rotation (X4) substantially parallel to said first axis of rotation (X1) and having said at least one small arm (15, 16).

4. Machine (1) according to claim 1, wherein said automatic operation device (21) comprises at least a switch (21) and said at least one small arm (15, 16) comprises at least a contact portion (22) which can be engaged on said switch (21) in correspondence of at least a predefined angular position.

5. Machine (1) for removing and fitting wheel tyres for vehicles, comprising:
   at least a bearing structure (2),
   a clamping device (5) of a rim (C) of a wheel (R) for vehicles, associated with said bearing structure (2) and rotatable around a first axis of rotation (X1),
   at least a tool-carrying arm (6) associated movable with said bearing structure (2) and having at least a removing/fitting tool (7) of a tyre (P) from/onto said rim (C), and
   at least an auxiliary arm (8) having at least a bead pressing tool (9, 10) able to facilitate the removing/fitting operations of the tyre (P) from/onto the rim (C) and associated rotatable with said bearing structure (2) around a second axis of rotation (X2) substantially parallel to said first axis of rotation (X1);
   at least a movement device (17) of said auxiliary arm (8) and/or of at least one bead pressing tool (9, 10) along a substantially vertical direction between a raised position and a lowered position;
   wherein said auxiliary arm (8) comprises at least a first small arm (15) and a second small arm (16) rotatable around a third axis of rotation (X3) substantially parallel to said first axis of rotation (X1) and having respective bead pressing tools (9, 10) able to facilitate the removing/fitting operations of the tyre (P) from/onto the rim (C), wherein the distance of said third axis of rotation (X3) with respect to said first axis of rotation (X1) is defined by the following formula:

$$0<d(X1,X3)<r$$

where d(X1, X3) indicates said distance of the third axis of rotation (X3) with respect to the first axis of rotation (X1) and r indicates at least a value corresponding to the radius of said wheel (R);
   wherein said automatic positioning apparatus (20) comprises at least an automatic operation device (21) of said movement device (17) operatively connected to said auxiliary arm (8) and able to be automatically activated in correspondence of a predetermined angular position of said auxiliary arm (8) to bring said at least one bead pressing tool (9, 10) from said lowered position to said raised position;
   wherein said auxiliary arm (8) comprises at least a horizontal arm (11, 12) associated rotatable with said bearing structure (2) around said second axis of rotation (X2) and at least a small arm (15, 16) having said at least one bead pressing tool (9, 10) and associated rotatable with said horizontal arm (11, 12) around a third axis of rotation (X3) substantially parallel to said first axis of rotation (X1);
   wherein the machine (1) comprises an automatic positioning apparatus (20) that comprises at least a return element associated with said auxiliary arm (8) and able to bring said auxiliary arm (8) back to said rest position when said at least one bead pressing tool (9, 10) is in the raised position;
   wherein said return element comprises at least an elastic element associated with said auxiliary arm (8).

6. Machine (1) according to claim 5, comprising a locking/unlocking apparatus (23, 24, 25, 26) for locking said second small arm (16) with respect to said horizontal arm (11, 12).

7. Machine (1) according to claim 6, wherein said locking/unlocking apparatus (23, 24, 25, 26) comprises at least a retaining element (23) associated with said horizontal arm (11, 12) and movable between a fastening position, wherein it is engaged on said second small arm (16) to keep said horizontal arm (11, 12) and said second small arm (16) linked together, and an unfastening position, wherein it is disengaged from said second small arm (16) and said second small arm (16) is free to rotate around said third axis of rotation (X3).

8. Machine (1) according to claim 7, wherein said locking/unlocking apparatus (23, 24, 25, 26) comprises an operation device (25) able to move said retaining element (23) from said fastening position to said unfastening position in correspondence of at least a predefined angular position of said first small arm (15).

9. Machine (1) according to claim 8, wherein said operation device (25) comprises at least a pushing element which is linked together with said first small arm (15) and which can be engaged on said retaining element (23) in correspondence of said at least one predefined angular position.

10. Machine (1) according to claim 9, wherein said auxiliary arm (8) comprises at least a spacer element (26, 27) of predefined extension and interposed between said first small arm (15) and said second small arm (16).

* * * * *